Dec. 7, 1965   J. T. MODLOFF ETAL   3,221,911
TRUSS AND MATERIALS HANDLING TRAILER
Filed Oct. 8, 1962   3 Sheets-Sheet 1

Inventors.
Jay T. Modloff.
Billy J. Sayers.
By Zabel, Baker, York, Jones + Dithmar
Attorneys.

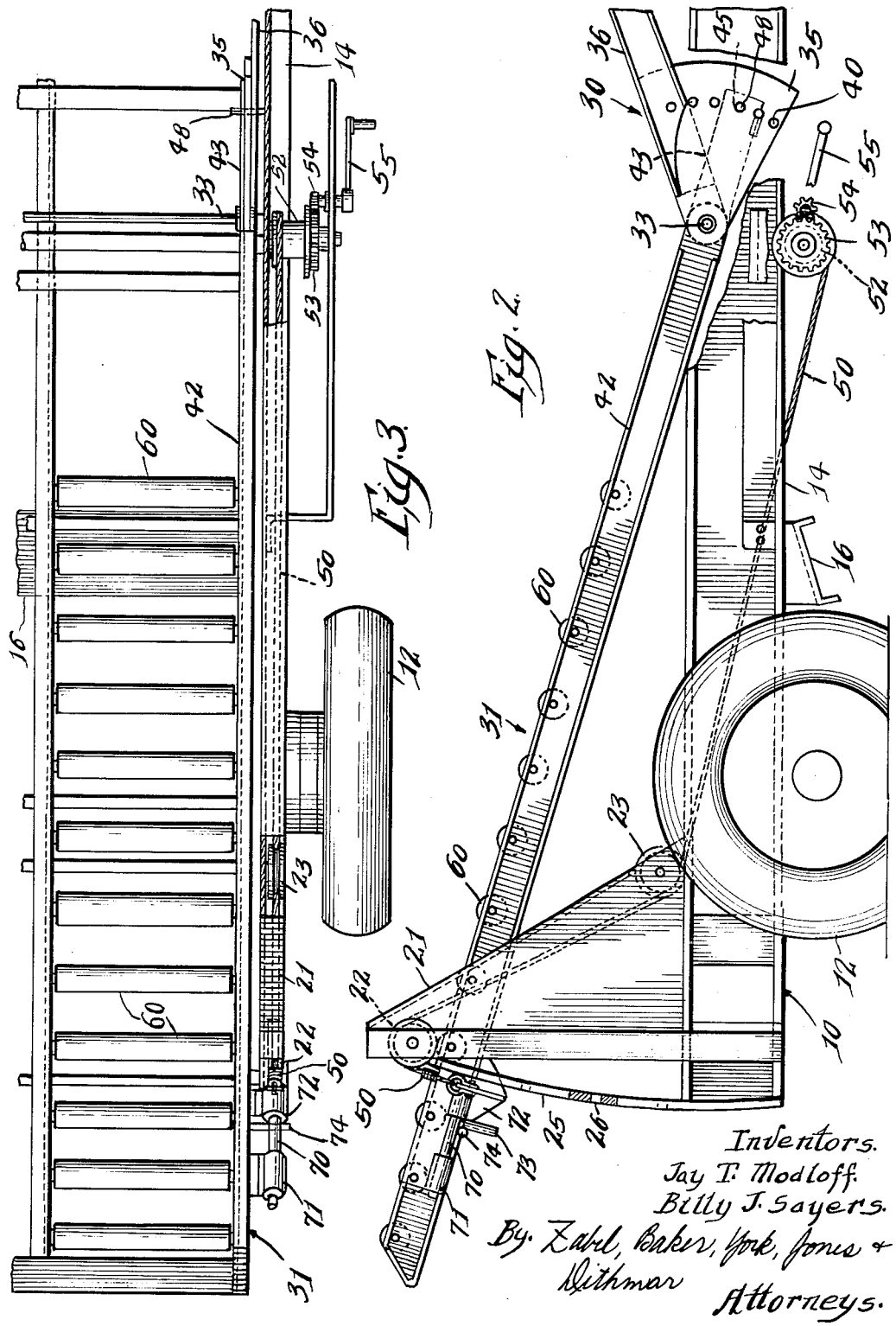

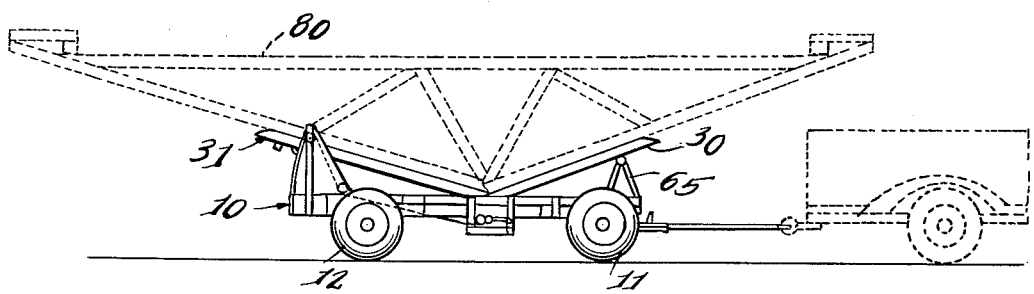
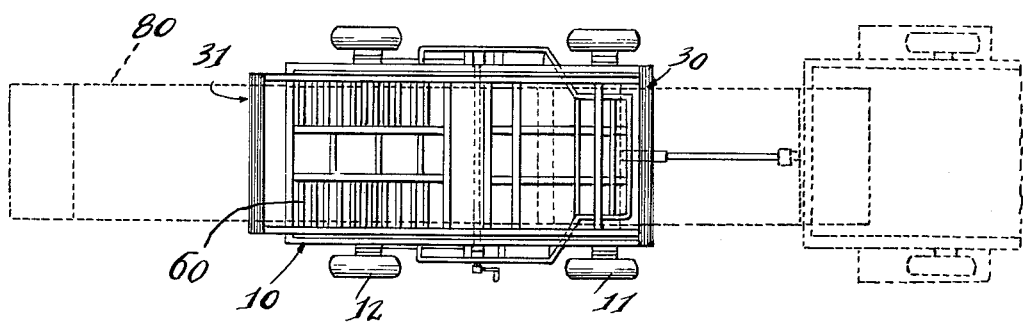
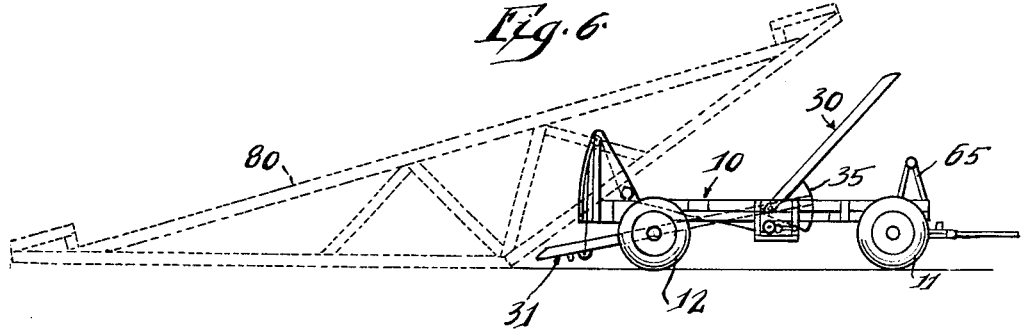

United States Patent Office 3,221,911
Patented Dec. 7, 1965

3,221,911
TRUSS AND MATERIALS HANDLING TRAILER
Jay T. Modloff and Billy J. Sayers, De Kalb, Ill., assignors to De Kalb Commercial Body Corporation, De Kalb, Ill., a corporation of Illinois
Filed Oct. 8, 1962, Ser. No. 228,822
2 Claims. (Cl. 214—505)

This invention relates to a truss and materials handling trailer, and more particularly to a trailer adapted to handle prefabricated roof trusses of various sizes and shapes. The trailer also is adapted to handle sheet material and pallet loads, as well as loads of other bulky materials, all with extreme facility.

One object of the invention is to provide a vehicle for transporting prefabricated roof trusses. As is well known, such trusses are large and irregularly shaped structures that do not lend themselves to travel on conventional trucks or trailers.

Another object of the invention is to provide a truss-carrying vehicle that takes the form of a trailer. Thus, the trailer may be pre-loaded while the truck intended to haul the trailer is otherwise engaged.

Still another object of the invention is to provide a trailer for prefabricated roof trusses that can be loaded and unloaded with the labor of only one man. The trailer thus produces significant savings in labor, compared with prior vehicles which require more than one man for handling a load of trusses. The trailer is such that the trusses easily slide by gravity from the trailer and are deposited gently on the ground.

Another object of the invention is to provide a trailer wherein bulky sheet material and pallet loads also may be eased gently to the ground without damage. This unloading operation also may be accomplished by one man.

Other objects, advantages and details of the invention will be apparent as the description proceeds, reference being had to the accompanying drawings wherein a preferred form of the invention is shown. It is to be understood that the description and drawings are illustrative only, and that the scope of the invention is to be measured by the appended claims.

FIG. 2 is a fragmentary side elevational view, partly broken away, of the trailer shown in FIG. 1, the view illustrating the rear portion of the trailer side.

FIG. 3 is a fragmentary top plan view of the trailer portion shown in FIG. 2.

FIG. 4 is a reduced side elevational view showing the trailer loaded with roof trusses.

FIG. 5 is a top plan view of the loaded trailer shown in FIG. 4.

FIG. 6 is a side elevational view illustrating the manner in which roof trusses are unloaded from the trailer.

Figure 1:
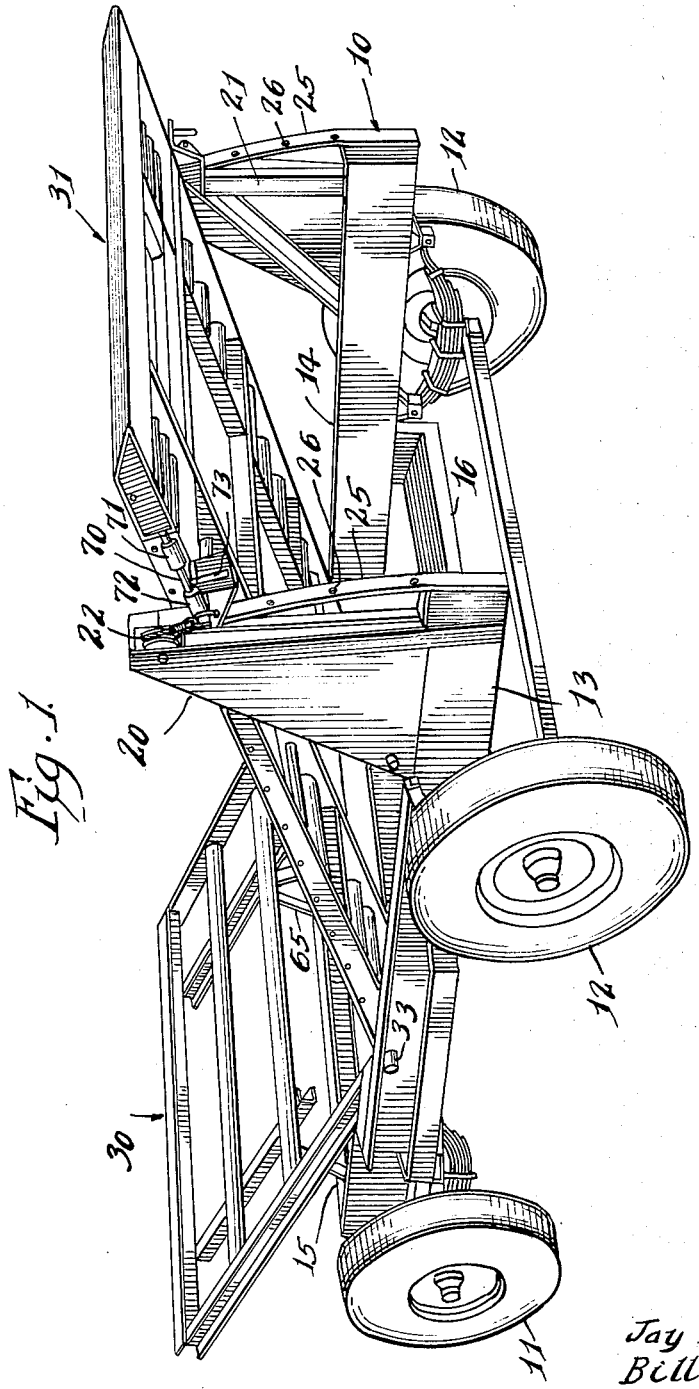
FIG. 1 is a rear perspective view of a truss and materials handling trailer embodying the invention.

Referring to FIG. 1 of the drawings, the truss and materials handling trailer of the invention includes a generally horizontal framework 10 adapted to be supported by front wheels 11 and rear wheels 12 in conventional manner. Front wheels 11 are carried by suitable steering mechansm, not shown.

Framework 10 includes spaced side members 13 and 14, which may be more widely separated in the rear portion of the trailer than in the front portion. Framework 10 also includes a front transverse member 15 and a rear transverse member 16, these members being secured to side members 13 and 14. As best shown at the right in FIG. 1, rear tranvserse member 16 is disposed below side members 13 and 14 and somewhat forwardly of the rear ends of the members.

Uprights 20 and 21 are mounted on the rear portions of the respective side members 13 and 14, as best shown in FIGS. 1 and 2. Referring to upright 20 as representative of both, each upright has an upper pulley 22 and a lower pulley 23 rotatably mounted thereon. Each upright also includes a rear strip 25 having spaced apertures 26. As will be seen later, strip 25 and apertures 26 cooperate to position rigidly the adjustable bed members now to be described.

Still referring to FIG. 1, the trailer of the invention includes cooperating front and rear bed members 30 and 31. These bed members are of generally like size, and are mounted in generally end-to-end relation on framework 10. Rear bed member 31 has a width less than the distance between adjacent portions of side members 13 and 14.

The adjoining ends of bed members 30 and 31 are mounted on framework 10 in pivotal manner with respect both to framework 10 and to each other. A transverse shaft 33, either continuous or discontinuous, carried by side members 13 and 14 serves as a pivot bearing for the adjacent ends of bed members 30 and 31.

Means are provided adjacent shaft 33 to interconnect bed members 30 and 31 in adjustable manner so that the angulation between the members may be varied to accommodate various roof trusses and other loads. Suitable adjustment structure is shown at the right in FIGS. 2 and 3, and it will be understood that the angulation between bed members 30 and 31 may be varied from about 180° (to accommodate flat or pallet loads) to a plurality of lesser angles (to accommodate roof trusses having different pitches).

Referring to FIGS. 2 and 3, a plate 35 is secured to the inside face of each longitudinal side member 36 of front bed member 30. As illustrated, each plate 35 may be a disk segment, and it is mounted on a side member 36 with one radial edge in general alignment with the upper edge of member 36. The major part of each plate 35 extends below side member 36, and the apex portions of the plates are journalled on shaft 33.

Each plate 35 has a row of spaced apertures 40 lying on an arc centered on shaft 33.

Longitudinal side members 42 of rear bed member 31 are journalled on shaft 33 and extend forwardly of the shaft, terminating in front portions 43. An aperture 45 is provided in each front portion 43 to align with any one of the apertures 40 in plates 35.

Removable pins 48 extend through apertures 45 and selected apertures 40 to establish rigid connection between front and rear bed members 30 and 31 with predetermined angle between them. The maximum angle is about 180 degrees, and a number of lesser angles are provided, depending on the pitch angles of the roof trusses to be carried by the trailer.

The trailer also includes adjustment means extending between framework 10 and one of the bed members 30 and 31 so the bed members may be pivoted simultaneously with respect to framework 10 and secured rigidly in predetermined position. In the illustrated form of the invention, uprights 20 and 21, pulleys 22 and 23 in each upright, and apertured strips 25 comprise part of this adjustment means. Remaining parts include cables 50 (FIGS. 2 and 3) having one end of each secured to rear bed member 31 adjacent uprights 20 and 21.

Cables 50 extend over upper pulleys 22 and under lower pulleys 23 and terminate on a drum means 52. The latter is rotatably mounted on framework 10 with a part at each framework side, and, as illustrated, is located adjacent pivot shaft 33. A gear 53 is connected to drum means 52 and driven by a smaller gear 54 which in turn is provided with a manual crank 55. Drum means 52, of course, varies the effective length of cables 50 and thereby pivots bed members 30 and 31 simultaneously with respect to framework 10.

It will be remembered that rear transverse framework member 16 is disposed below side members 13 and 14 and that the width of rear bed member 31 is less than the distance between the side members. These structural features enable rear bed member 31 to be pivoted in framework 10 below the plane of the framework, as illustrated in FIG. 6.

Rear bed member 31 preferably is provided with a plurality of transverse rollers 60. These rollers cooperate in connection with unloading the trailer. When rear bed member 31 is pivoted downwardly below the plane of framework 10, a load of roof trusses or other materials will be conveyed by rollers 60 from bed member 31 to engagement with the ground. Thereafter, the trailer may be pulled forwardly to discharge the load completely. It will be noted that the unloading process easily can be accomplished by one person.

For stability during movement of the trailer, a detachable support structure 65 (FIGS. 4 and 6) may be provided at the forward end of framework 10. Structure 65 gives support to the forward end of front bed member 30.

Rear bed member 31 may be connected rigidly to uprights 20 and 21 by means of bolts 70 (FIGS. 1–3) which are mounted on the bed member. Bolts 70 slide in bearings 71 and 72 and are actuated longitudinally and rotatably by finger 73 so the forward ends of the bolts may enter desired apertures 26 in strip 25. A keeper 74 engages finger 73 and maintains a bolt 70 in forward position when the finger is rotated to point downwardly.

FIGS. 4 and 5 illustrate the trailer of the invention loaded with inverted roof trusses 80, shown in broken line. It will be noted that the angle between front and rear bed members 30 and 31 has been selected to accommodate the pitch of the trusses. FIG. 6, as mentioned, illustrates the bed members in rearwardly tilted position for unloading the trusses.

From the above description it is thought that the construction and advantages of the invention will be readily apparent to those skilled in the art. Various changes in detail may be made without departing from the spirit or losing the advantages of the invention.

Having thus described the invention, what I claim as new and desire to secure by Letters Patent is:

1. A truss and materials handling trailer comprising:
a generally horizontal framework adapted to be supported by wheels, said framework including spaced side members and front and rear transverse members secured thereto, said rear transverse member disposed below said side members and forwardly of the rear ends thereof;
an upright mounted on the rear portion of each side member;
an upper pulley and a lower pulley rotatably mounted on each upright;
front and rear bed members of generally like size in end-to-end relation on said framework, said rear bed member of width less than the distance between adjacent portions of said side members;
means mounting the adjacent ends of said bed members in pivotal manner with respect to said framework and to each other;
means interconnecting said bed members in adjustable manner to vary the angulation therebetween;
cables secured to said rear bed member and engaging said upper and lower pulleys, and
rotatable drum means on said framework varying the effective length of said cables whereby said bed members are pivoted simultaneously with respect to said framework, said rear bed member pivotal below the plane of said framework to facilitate unloading.

2. The combination of claim 1 with the addition of means rigidly interconnecting said rear bed member and said uprights at selective levels of elevation.

References Cited by the Examiner
UNITED STATES PATENTS

| | | | |
|---|---|---|---|
| 1,977,497 | 10/1934 | Springer | 214—130 X |
| 2,299,372 | 10/1942 | Barrett | 298—19 |
| 2,346,293 | 4/1944 | Croy | 214—1 |
| 2,536,561 | 1/1951 | Mickam | 214—84 X |
| 2,569,050 | 9/1951 | Gref | 214—84 X |
| 2,739,836 | 3/1956 | Kilpatrick | 214—505 X |
| 3,091,498 | 5/1963 | Goodwin | 298—8 |

HUGO O. SCHULZ, *Primary Examiner.*

MORRIS TEMIN, *Examiner.*